United States Patent [19]

Johnston

[11] 4,171,172
[45] Oct. 16, 1979

[54] AUXILIARY IMPLEMENT MOUNT

[75] Inventor: Larry C. Johnston, Audubon, Iowa

[73] Assignee: Emmert Mfg. Co., Inc., Audubon, Iowa

[21] Appl. No.: 803,804

[22] Filed: Jun. 6, 1977

[51] Int. Cl.² ............... A01B 5/04; A01B 15/00; A01B 49/02; F16B 9/02
[52] U.S. Cl. ............... 403/71; 172/202; 172/620; 172/763; 403/167; 403/188
[58] Field of Search .............. 403/188, 69, 70, 71, 403/167, 168; 172/619, 620, 621, 624, 629, 657, 762, 763, 195, 201, 202, 691, 692, 693

[56] References Cited

U.S. PATENT DOCUMENTS

| 198,716 | 12/1877 | Wertman | 172/620 X |
|---|---|---|---|
| 2,709,085 | 5/1955 | Stueland | 172/624 X |
| 3,255,831 | 6/1966 | Kirkpatrick, Jr. | 172/620 X |
| 3,774,694 | 11/1973 | Gates | 172/763 X |
| 3,976,145 | 8/1976 | Blair | 172/763 X |
| 4,029,155 | 6/1977 | Blair et al. | 172/620 X |

OTHER PUBLICATIONS

*Lift Midwest Harrow*, Midwest Industries, Inc., Ida Grove, Iowa, Form LHC73, 4 pp.
*Noble Harrow Master*, Noble Manufacturing Co., Sac City, Iowa, Form 673-0, 16 pp.

*Primary Examiner*—Robert Mackey
*Attorney, Agent, or Firm*—Henderson & Sturm

[57] ABSTRACT

An auxiliary implement mount which utilizes a triangular shape for attaching to a variety of shapes and sizes of tool bars of a first implement in a variety of positions. A rod is pivotally attached by a pin through one of a series of holes arranged in a triangle configuration on a plate to the mount at one end thereof and to an auxiliary implement at the other end thereof. The rod is laterally stabilized by a bracket with a spring inside for exerting downward pressure and allowing vertical movement. The auxiliary implement is attached to the rod's other end by a wedge-shaped plate that utilizes a collar on the rod to tilt the implement at a desired angle to the ground.

9 Claims, 13 Drawing Figures

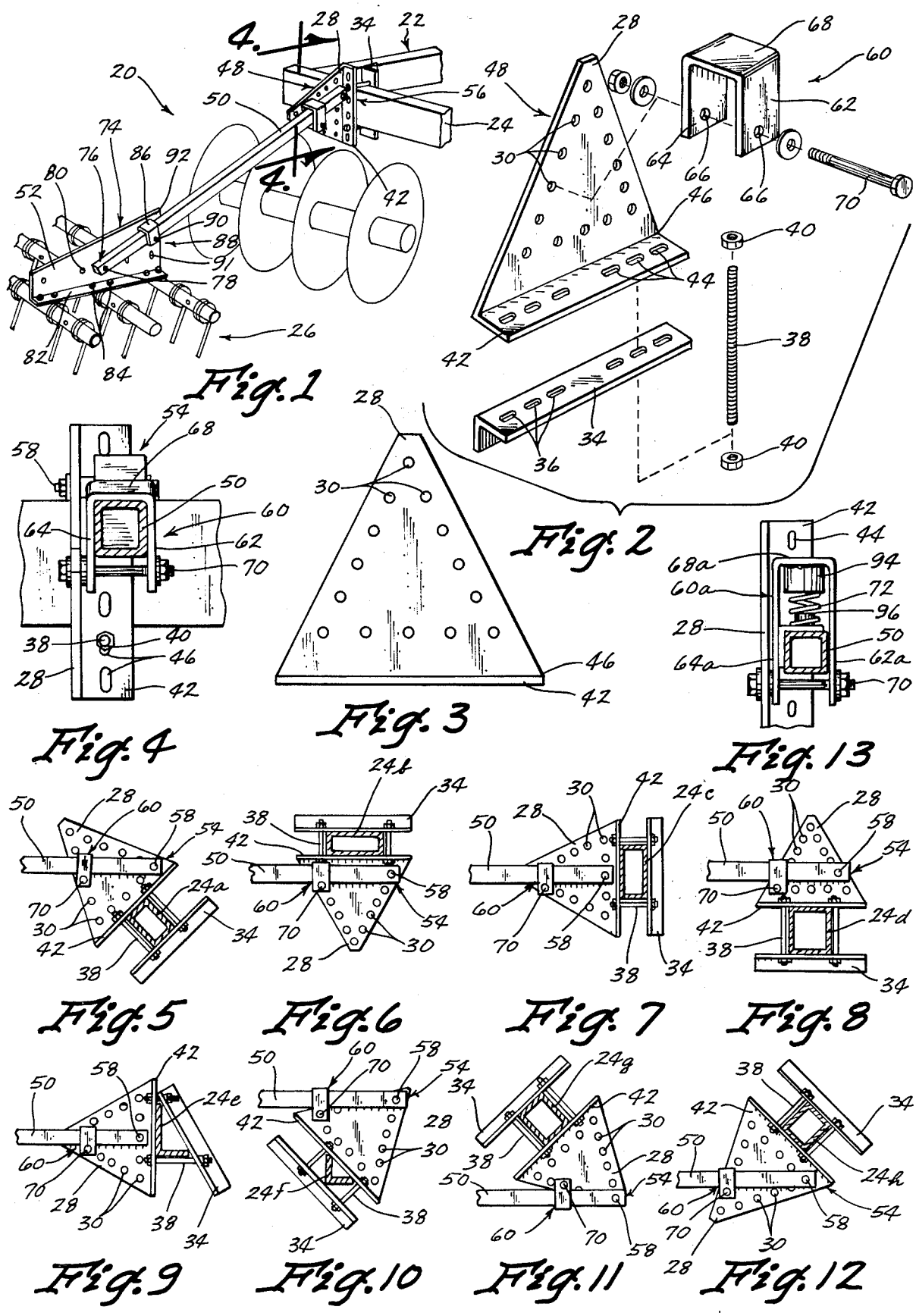

AUXILIARY IMPLEMENT MOUNT

BACKGROUND OF THE INVENTION

This invention relates to auxiliary implement mounts. When using a tractor, the operator often desires to use more than one implement at a time. Hitching the first implement to the tractor can usually be accomplished easily because of the standardization of mounting mechanisms. However, mounting an auxiliary implement is not so easy because no standardization exists. Because of the differing sizes, shapes and positions of the tool bar, necessitated by varying functions that the first implement must perform, a flexible mounting mechanism is required. The flexible mechanism must allow easy and quick secure mounting to various faces of the tool bar.

The auxiliary implement mount must also allow some vertical movement to the implement in case the auxiliary implement hits a rock or other obstacle. The allowed vertical movement would permit the implement to rise over the obstacle while continuing its forward movement. However, the implement must also be forced downward and tilted at a proper angle to perform its function (such as harrowing).

SUMMARY OF THE INVENTION

This invention relates to an auxiliary implement mount adapted for use in combination with different sizes and shapes of tool bars of a first implement. The auxiliary implement mount is comprised of a plate, a device for attaching the plate to the first implement's tool bar, a rod, two other devices for attaching the rod to the plate, and still another device for attaching an auxiliary implement to the rod. The plate has at least six holes disposed in a triangular configuration and one edge adapted to abut the tool bar of the first implement. The device for attaching the plate to the first implement's tool bar orients the plate transversely to the longitudinal axis of the bar. The rod has an opening in one end. One of the two devices for attaching the rod to the plate does so pivotally and includes a pin that extends through the opening in the rod and through one of the holes in said plate. The other device attaches a portion of the rod to a portion of the plate adjacent to another hole.

It is an object of the invention to provide an auxiliary implement mount that can be attached to various faces of the first implement's tool bar.

Another object of the present invention is the provision of an auxiliary implement mount whose tool bar attachment plate can be oriented in several planes in relation to the ground, thus providing great flexibility.

Another object of the present invention is the provision of an auxiliary implement mount whose rod running between plates for mounting on first implement's tool bar and attached for auxiliary implement is laterally stabilized by a U-shaped member attached to the tool bar plate.

A still further object of the present invention is pivotal attachment of the rod running between the implements to the plate that attaches to the tool bar.

Another object of the present invention is to apply downward force on the rod connecting the implements, but yet allow freedom of vertical movement for the rod.

Another object of the present invention is to mount the auxiliary implement at a desired angle to the ground.

Another object of the present invention is to allow quick and easy attachment and detachment of an auxiliary implement to the first implement.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the auxiliary implement mount running between a first implement's tool bar and an auxiliary implement;

FIG. 2 is a detailed enlarged, exploded perspective view of the part of the auxiliary implement mount that abuts the tool bar and also the collar part that surrounds the rod end;

FIG. 3 is a vertical cross-sectional view of the plate;

FIG. 4 is a vertical cross-sectional view taken along line 4—4 of FIG. 1;

FIGS. 5–12 are vertical cross-sectional views of the auxiliary implement mount attached to various sizes and shapes of tool bars; and FIG. 13 is a vertical cross-sectional view like that of FIG. 4 but showing an alternate embodiment.

DESCRIPTION OF THE PREFERRED EMBODIMENT

Referring now to the drawings, and more particularly to FIGS. 1–4, the present invention relates generally to an auxiliary implement mount 20. The mount 20 is shown in FIG. 1 attached to the first implement 22 at a point on the tool bar 24. The mount 20 is also shown attached to the auxiliary implement 26. The plate 28 of the mount 20, shown in detail in FIG. 3, is preferably triangular in shape. A plurality of holes 30 are disposed in the plate 28 in a triangular configuration regardless of the shape of the plate 28.

In FIG. 1, the triangular plate 28 is shown abutting the tool bar 24 of the first implement 22. The plate 28 is attached to a backup member 34 on the opposite side of the tool bar 24. The backup member 34, shown in more detail in FIG. 2, has holes 36 through which bolts 38 are passed. Nuts 40 are placed on the bolt 38 where it projects away from the side of the backup member 34 opposite the point of abutment with the tool bar 24 through the flange 42 of the plate 28. The bolt 38 travels through the flange 42 via holes 44 in the flange 42. On the opposite side of where the flange 42 abuts the tool bar 24, the bolt 38 is fitted with another nut 40. The flange 42 extends at a right angle from one edge 46 of the plate 28.

When the plate 28 is attached, as shown in FIG. 1, by the backup member 34, it is transverse to the longitudinal axis of the tool bar 24. FIGS. 5–12 show the plate 28 and backup member 34 attached to a variety of different tool bars 24a, 24b, 24c, 24d, 24e, 24f, 24g and 24h. The FIGS. 5–12 demonstrate the variety of shapes and sizes of tool bars 24 to which the mount 20 can be attached. The FIGS. 5–12 show also the variety of orientations of the plate 28 in relation to the first implement 22.

In FIG. 1, a rod 50 runs between the plate 28 and the wedge-shape plate 52 to which the auxiliary implement 26 is attached. The rod 50 has an opening in one end 56. The opening allows a pin 58, shown in FIG. 5, to extend through the rod 50 and further through a hole 30 in the plate 28. When the pin 58 is so positioned, the rod 50 is pivotally attached to the plate 28 as shown in FIGS. 1 and 5.

The rod 50 is laterally stabilized, in FIG. 5, by attaching a portion of it to a portion of the plate 28 adjacent to a hole 30 in the plate 28 different from the hole 30 serving to pivotally attach the rod end 56. The rod 50 is allowed freedom of vertical movement with respect to the plate 28 by the U-shaped member 60 shown in FIG. 2. The U-shaped member 60 has two free ends 62 and 64, each with an opening 66. The two free ends 62 and 64 are connected by a transverse portion 68 of the U-shaped member 60. A pin 70 extends through the openings 66 in both members 62 and 64 and continues through a hole 30 in the plate 28 when all openings 66 and 30 are aligned.

FIG. 13 shows a cross sectional view of an alternate embodiment of the invention having the rod 50 running between the pin 70 and the transverse portion 68a of the U-shaped member 60a. A spring 72 between the transverse portion 68 of the U-shaped member 60a and the rod 50 downwardly biases the rod 50 but allows vertical movement. A cup-shaped retaining member 94 is welded to the top 68a so as to retain the top of the spring 72 and a boss 96 is provided at the bottom of the spring to hold it in place.

The other end 76 of the rod 50 as shown in FIG. 1 has an opening for attaching the auxiliary implement 26. The auxiliary implement is attached to a wedge-shaped plate 52. The wedge-shaped plate 52 is pivotally attached to the end 76 of the rod 50 by a pin 78. The pin 78 extends through a hole 80 in the wedge-shaped plate 52 and further extends through the opening in the rod 50. The wedge-shaped plate 52 has a flange 82 to which the auxiliary implement 26 is secured. The flange 82 extends at a right angle from the bottom edge 84 of the wedge-shaped plate 52. A collar 86, shown in FIG. 1, that surrounds another portion of the rod 50, further attaches the rod 50 to the wedge-shaped plate 52. The collar 86 has a flange containing an opening. A pin 90 extends through the opening and further extends through any one of a line of openings 91 disposed in the front edge 92 of the wedge-shaped plate 52.

Obviously many modifications and variations of the present invention are possible in light of the above teachings. It is therefore to be understood that, within the scope of the appended claims, the invention may be practiced otherwise than as specifically described.

I claim:

1. An auxiliary implement mount, adapted for use in combination with different sizes and shapes of tool bars of a first implement, comprising:
    a single L-shaped plate member forming a triangular shaped upper plate portion with at least six holes disposed in a triangular configuration adjacent the periphery of the upper plate portion, one edge of said plate member having a rectangular flanged portion, extending along its entire length with a series of apertures disposed therein, said flanged portion of said plate extending at a right angle with respect to said upper plate portion and being adapted to abut said first implement's tool bar;
    means for attaching said flanged portion of said plate to said first implement's tool bar so that said plate is transverse to the longitudinal axis of said first implements tool bar;
    a rod having an opening in one end thereof;
    means for pivotally attaching said rod to said plate, said pivotal means including a pin extending through said opening in said rod and through one of the holes in said plate;
    means for attaching a portion of said rod to another portion of said plate adjacent another hole; and
    means for attaching an auxiliary implement to the other end of said rod;
    whereby the plate member may be rotated to multiple operating positions to accommodate tool bars having different sizes, shapes, and inclinations.

2. The auxiliary implement mount of claim 1 wherein said means for attaching said plate to said first implement's tool bar comprises a flanged backup member, a series of holes disposed in said member, and a bolt and nut assembly for connecting said plate flange and said member when disposed on opposite sides of said first implement's tool bar.

3. The auxiliary implement mount of claim 1 wherein said means for attaching an auxiliary implement includes an opening in the other end of said rod, and further comprises a pin extending through the opening in the other end of the rod and through a hole in an apertured wedge-shaped plate, said wedge-shaped plate having an apertured flange element extending at a right angle from the bottom edge of said wedge adapted for securing said auxiliary implement thereto.

4. The auxiliary implement mount of claim 3 wherein said attaching means for an auxiliary implement further comprises a collar for surrounding another portion of said rod, said collar having a flange with an opening in it; a pin extending through said opening in said collar flange and through any one of a line of openings disposed along the front edge in said wedge-shaped plate; and said hole in the wedge-shaped plate for pivotal mounting of said rod being any one of a line of holes disposed along the bottom edge of said wedge-shaped plate.

5. The auxiliary implement mount of claim 1 wherein said means for attaching a portion of said rod to another portion of said plate adjacent another hole includes means for allowing vertical movement of said rod with respect to said plate.

6. An auxiliary implement mount of claim 5 wherein said means for attaching said rod to said plate also contains a means for biasing said rod downwardly.

7. The auxiliary implement mount of claim 5 wherein said means for attaching said rod allowing vertical movement with respect to said adjacent plate further comprises a U-shaped member having two free ends and a transverse portion between the ends, an opening disposed in each free end, said openings being in alignment to allow a pin to extend through both of said U-shaped member openings and through holes in said plate when said rod is disposed between said pin and said transverse portion of U-shaped member.

8. An auxiliary implement mount of claim 7 wherein said means for attaching said rod to said plate also further comprises a spring between said transverse portion of said U-shaped member and said rod for downward biasing of said rod.

9. An auxiliary implement mount of claim 1 wherein said plate has 14 holes arranged in a triangular configuration.

* * * * *